United States Patent
Schaefer

(10) Patent No.: US 9,833,881 B1
(45) Date of Patent: Dec. 5, 2017

(54) METHOD AND MEANS FOR SECURING A FACE FRAME TO A BOX CABINET

(71) Applicant: Robert M. Schaefer, Beaver Lake, NE (US)

(72) Inventor: Robert M. Schaefer, Beaver Lake, NE (US)

( * ) Notice: Subject to any disclaimer, the term of this patent is extended or adjusted under 35 U.S.C. 154(b) by 429 days.

(21) Appl. No.: 14/529,240

(22) Filed: Oct. 31, 2014

(51) Int. Cl.
- *B25B 5/04* (2006.01)
- *B25B 5/14* (2006.01)
- *B25B 5/16* (2006.01)
- *A47B 96/00* (2006.01)

(52) U.S. Cl.
CPC .............. *B25B 5/145* (2013.01); *A47B 96/00* (2013.01); *B25B 5/04* (2013.01); *B25B 5/163* (2013.01)

(58) Field of Classification Search
CPC ........... A47B 96/00; B25B 5/04; B25B 5/145; B25B 5/163
See application file for complete search history.

(56) References Cited

U.S. PATENT DOCUMENTS

| | | | | |
|---|---|---|---|---|
| 2,815,777 | A * | 12/1957 | Iraids | B25B 5/06 24/507 |
| 4,923,163 | A * | 5/1990 | Harley | F16B 12/20 24/458 |
| 6,644,636 | B1 * | 11/2003 | Ryan | B25B 5/06 269/156 |
| 7,134,651 | B1 * | 11/2006 | Beck | B25B 5/102 269/147 |

OTHER PUBLICATIONS http://www.diynetwork.com/how-to/skills-and-know-how/carpentry-and-woodworking/how-to-build-a-trash-bin-with-a-butcher-block-countertop.*
https://www.kregtool.com/store/c46/corner-clamps/p389/right-angle-clamp/.*

* cited by examiner

*Primary Examiner* — Mark A Osele
*Assistant Examiner* — Christopher C Caillouet
(74) *Attorney, Agent, or Firm* — Dennis L. Thomte; Thomte Patent Law Office LLC

(57) ABSTRACT

A method of securing a face frame to a cabinet box whereby spring clamps clamp the face frame to the cabinet box during the gluing process. The method eliminates the need for nails, staples, pocket screws or the like. The spring clamp of the invention enables the face frame to be secured to the outer ends of the cabinet box.

7 Claims, 9 Drawing Sheets

METHOD AND MEANS FOR SECURING A FACE FRAME TO A BOX CABINET

BACKGROUND OF THE INVENTION

Field of the Invention

This invention relates to a method and means for securing a face frame to a cabinet box. More particularly, this invention relates to a method and means for securing a face frame to a cabinet box without the use of nails, staples, pocket screws, splines, biscuits, tongue and groove, dowels or bar clamps.

Description of the Related Art

Conventional face frame cabinets are comprised of a cabinet box or carcass which may be a base cabinet, a wall cabinet or a tall cabinet. The typical cabinet has a horizontally disposed upper wall member having an outer end, an inner end, a first end, a second end, an upper surface and a lower surface. The cabinet box also includes a vertically disposed first side wall member having an outer end, an inner end, an upper end, a lower end, an outer surface and an inner surface. The cabinet box further includes a vertically disposed second side wall member having an outer end, an inner end, an upper end, a lower end, an outer surface and an inner surface. The cabinet box further includes a horizontally disposed bottom wall member having an outer end, an inner end, a first end, a second end, an upper surface and a lower surface.

The first end of the upper wall member is secured to the upper end of the first side wall member. The second end of the upper wall member is secured to the upper end of the second side wall member. The first end of the lower wall member is secured to the lower end of the first side wall member. The second end of the lower wall member is secured to the lower end of the second side wall member.

In conventional face frame cabinets, a face frame is secured to the outer ends of the upper wall member, the first side wall member, the second side wall member and the lower wall member. In some prior art methods, the face frame is secured to the cabinet box by nails extending through the face frame into the outer ends of the wall members of the cabinet box. In that situation, the nail holes must be filled with wood putty or the like in an effort to conceal the nail holes. Sometimes, the wood putty will have a different appearance than the face frame. In other installations, nails are toe-nailed into the face frame and the wall members of the cabinet box. In other installations, pocket screws are extended through the outer ends of the wall members into the face frame. All of the above described methods of securing a face frame to a cabinet box result in labor intensive steps and efforts to conceal the fastening elements.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The invention relates to two different methods of securing a face frame to a cabinet box or carcass. Both of the methods require the use of a conventional spring clamp which has been modified somewhat.

The spring clamp which is used in both of the disclosed methods is similar to a spring clamp marketed by Menard, Inc. having a product number 249-1316. The spring clamp of Menard, Inc. is modified somewhat to enable the spring clamp to be used to clamp a face frame to a cabinet box or carcass. The spring clamp of this invention includes an elongated and generally slightly curved first lever arm having a handle portion at one end thereof and a clamping portion at the other end thereof. The first lever arm terminates in a clamping jaw with the clamping jaw normally having a pad or sleeve mounted thereon. The handle portion of the first lever arm has a pair of spaced-apart ears extending transversely therefrom between the handle portion and the clamping portion thereof. The spring clamp also includes an elongated slightly curved second lever arm having a handle portion at one end thereof and a clamping portion at the other end thereof. A sleeve or pad embraces the handle portion of the second lever arm. The length of the clamping portion of the second lever arm is shorter than the length of the clamping portion of the first lever arm.

The second lever arm has a pair of spaced-apart ears extending therefrom between the handle portion and the clamping portion thereof. A pivot pin pivotally secures the ears of the first lever arm to the ears of the second lever arm whereby the lever arms may be moved between conventional clamping and non-clamping positions. A spring is mounted on the pivot pin and engages the inner sides of the lever arms to yieldably urge the lever arms to their clamping positions.

A spring clamp also includes an elongated pin, shaft or rod having an inner end and an outer end. The inner end of the elongated pin is secured to the clamping jaw of the second lever arm so that the pin extends outwardly therefrom in a generally parallel relationship to the clamping portion of the second lever arm. The pin of the second lever arm has a length whereby the outer end thereof will engage the inside of the pad or sleeve at the outer end of the clamping portion of the first lever arm when the clamping portions are in the clamping position.

The traditional cabinet box or carcass 14 to which the face frame will be attached has varying heights, widths and depths. The cabinet box will initially be described as being in a vertically disposed position as when it is secured to a wall or the like. The cabinet box includes a horizontally disposed upper wall member having a first end, a second end, an inner end, an outer end, an outer surface and an inner surface. An opening is drilled in the outer surface of the upper wall member which extends partially thereinto. The cabinet box also includes a vertically disposed first side wall member having an upper end, a lower end, an inner end, an outer end, an inner surface and an outer surface. The first side wall member has a plurality of spaced-apart openings or holes drilled therein which partially extend inwardly from the outer surface thereof inwardly of the outer edge thereof.

The cabinet box also includes a vertically disposed second side wall member having an upper end, a lower end, an inner end, an outer end, an inner surface and an outer surface. The second side wall member has a plurality of spaced-apart openings or holes drilled therein which partially extend inwardly from the outer surface thereof inwardly of the outer end thereof.

The cabinet box also includes a horizontally disposed lower wall member having a first end, a second end, an inner end, an outer end, an inner surface and an outer surface. At least one opening or hole is drilled into the outer surface of the lower wall member which extends partially thereinto.

The upper end of the first side wall member is secured to the first end of the upper wall member with the upper end of the second side wall member being secured to the second end of the upper wall member. The lower end of the first side wall member is secured to the first end of the lower wall member and the lower end of the second side wall member is secured to the second end of the lower wall member.

The face frame which is to be attached to the cabinet box includes a top rail, a bottom rail, a first stile and a second stile. The face frame may include a mid-rail which extends between the first and second stiles.

After the cabinet box has been assembled, the cabinet box will usually be placed on a horizontally disposed work surface so that the wall members of the cabinet box are vertically disposed with the inner ends thereof resting on the work support. Glue is then placed on the outer ends of the wall members. The face frame is then positioned on the glued outer ends of the wall members of the cabinet box. The spring clamps disclosed above are then clamped into position. The handle portions of the lever arms are squeezed together against the force of the spring incorporated therewith. The outer end of the spring of the spring clamp of the clamping jaw of the spring clamp is inserted into one of the openings formed in the outer surface of the side wall members with the clamping jaw of the first lever arm being positioned above one of the rails or stiles of the face frame. The worker then permits the lever arms to move to their clamping position. The spring clamp clamps the rail or stile of the face frame onto the cabinet box. The above-described steps are repeated for each of the spring clamps which are used to clamp the face frame onto the outer ends of the cabinet box.

In those cabinet boxes having shelf adjustment holes on the inner surfaces of the side wall members, it is not necessary to drill the holes in the outer sides of the wall members. In that situation, the pins of the spring clamps are inserted into the shelf adjustment openings on the inner surfaces of the side wall members of the cabinet box with the clamping portions thereof being positioned on the upper surfaces of the stiles of the face frame to securely clamp the face frame to the cabinet box during the gluing process.

A principal object of the invention is to provide an improved method and means for securing a face frame to a cabinet box.

A further object of the invention is to provide an improved method and means for securing a face frame to a cabinet box which eliminates the need for nails, staples, pocket screws, splines, biscuits, tongue and groove, dowels or bar clamps.

Yet another object of the invention is to provide an improved spring clamp which enables a face frame to be glued onto the outer ends of the wall members of the cabinet box.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
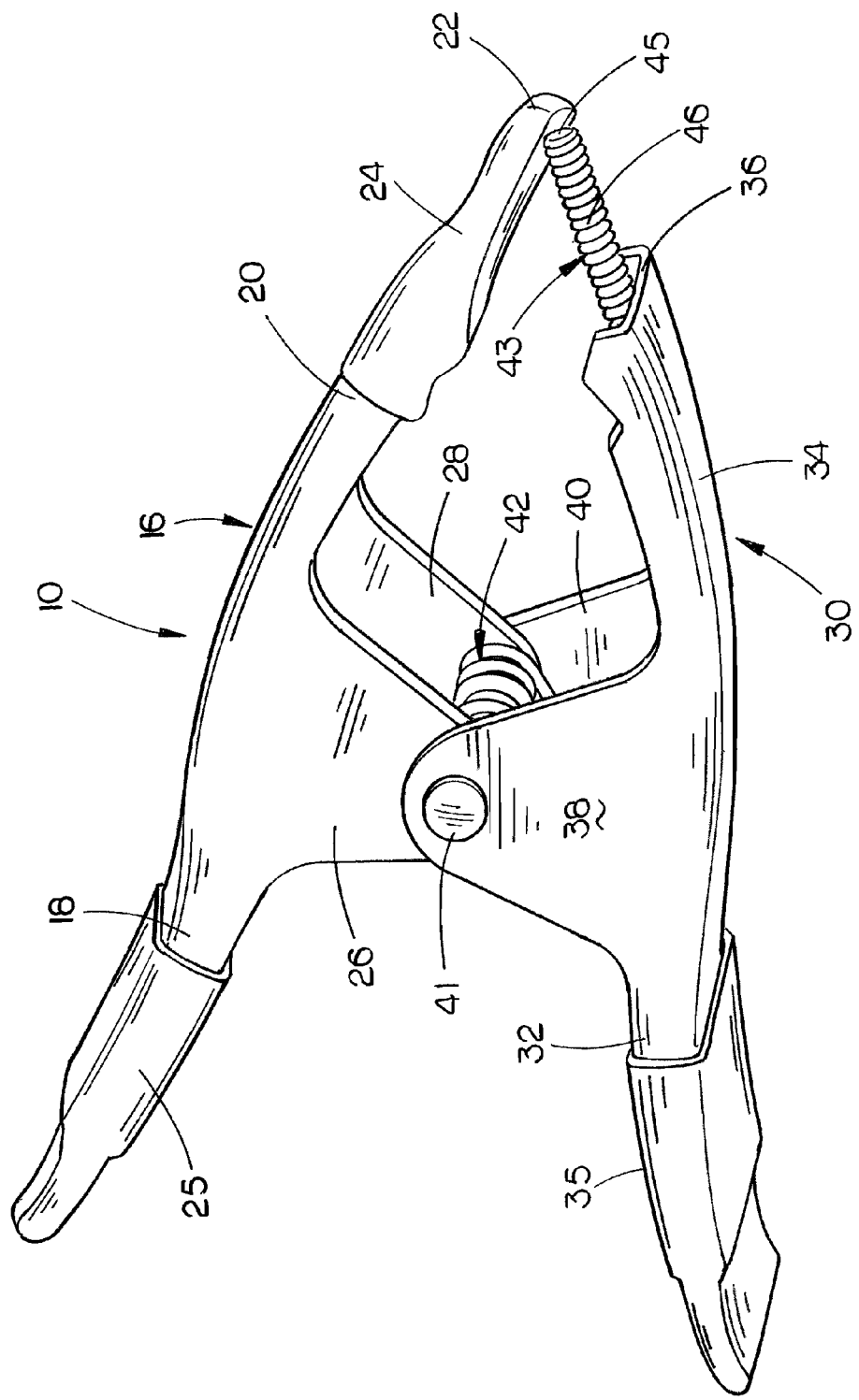
FIG. 1 is a perspective view of one of the spring clamps which are used in the attachment of a face frame onto a cabinet box according to the method of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a spring clamp, a plurality of which are used to attach a face frame 12 to a face frame cabinet box or carcass 14 as will be described in greater detail hereinafter. Spring clamp 10 is similar to a spring clamp marketed by Menard, Inc. having a product number 249-1316. The spring clamp of Menard, Inc. is modified somewhat to enable the spring clamp to be used to clamp a face frame to the cabinet box or carcass.

Spring clamp 10 includes an elongated and generally slightly curved first lever arm 16 having a handle portion 18 at one end thereof and a clamping portion 20 at the other end thereof. The first lever arm 16 terminates in a clamping jaw 22. The clamping jaw 22 normally has a pad or sleeve 24 thereon. Handle portion 18 normally has a sleeve 25 which embraces the outer end thereof. The first lever arm 16 has a pair of spaced-apart ears 26 and 28 extending transversely therefrom between the handle portion 18 and the clamping portion 20 thereof.

Spring clamp 10 also includes an elongated slightly curved second lever arm 30 having a handle portion 32 at one end thereof and a clamping portion 34 at the other end thereof. Sleeve 35 embraces handle portion 32. The second lever arm 30 terminates in a foreshortened clamping jaw 36. As seen, the length of the clamping portion 34 of lever arm 30 is shorter than the length of clamping portion 20 of lever arm 30.

Figure 2:
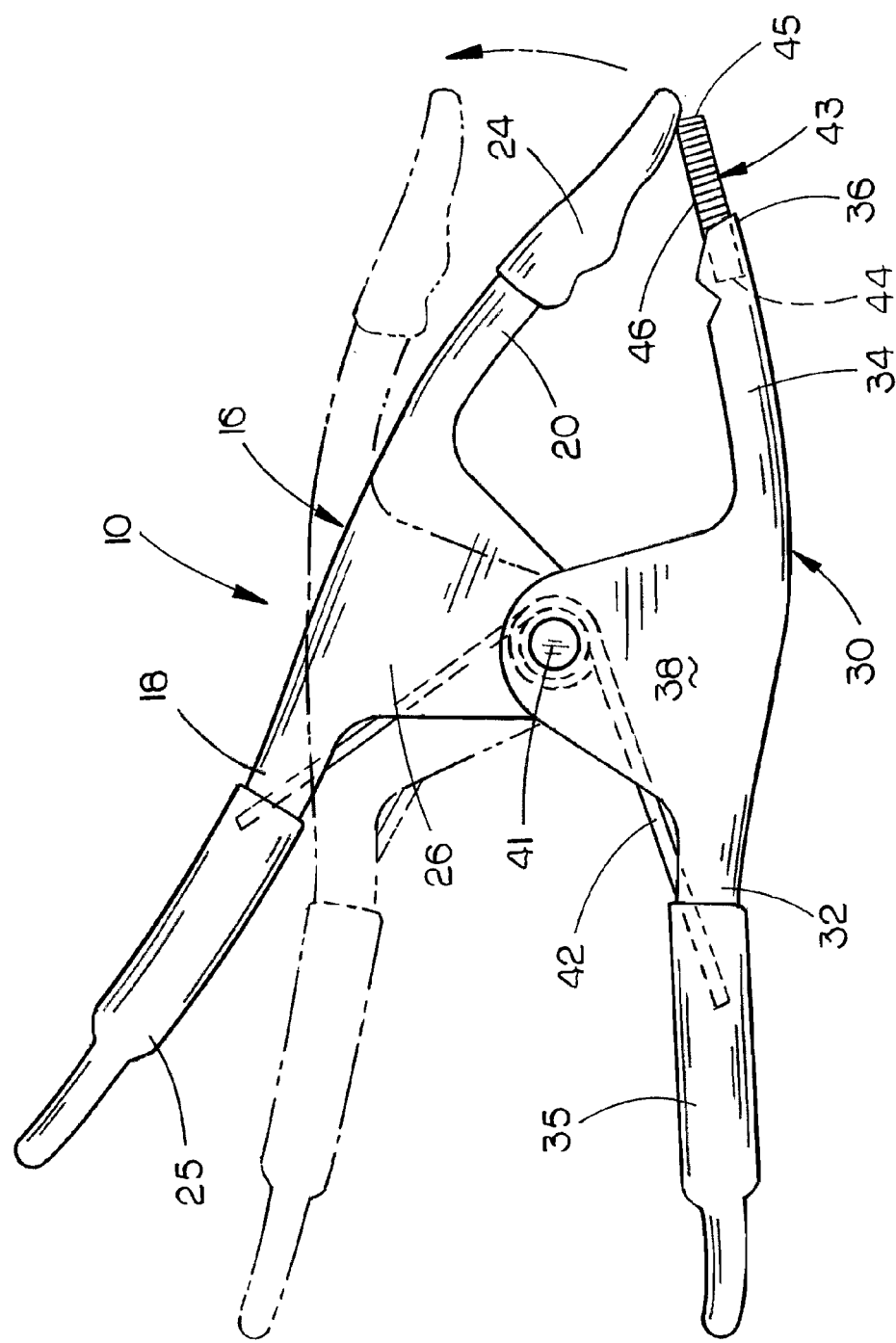
FIG. 2 is a side elevational view of the spring clamp of this invention.
Figure 3:
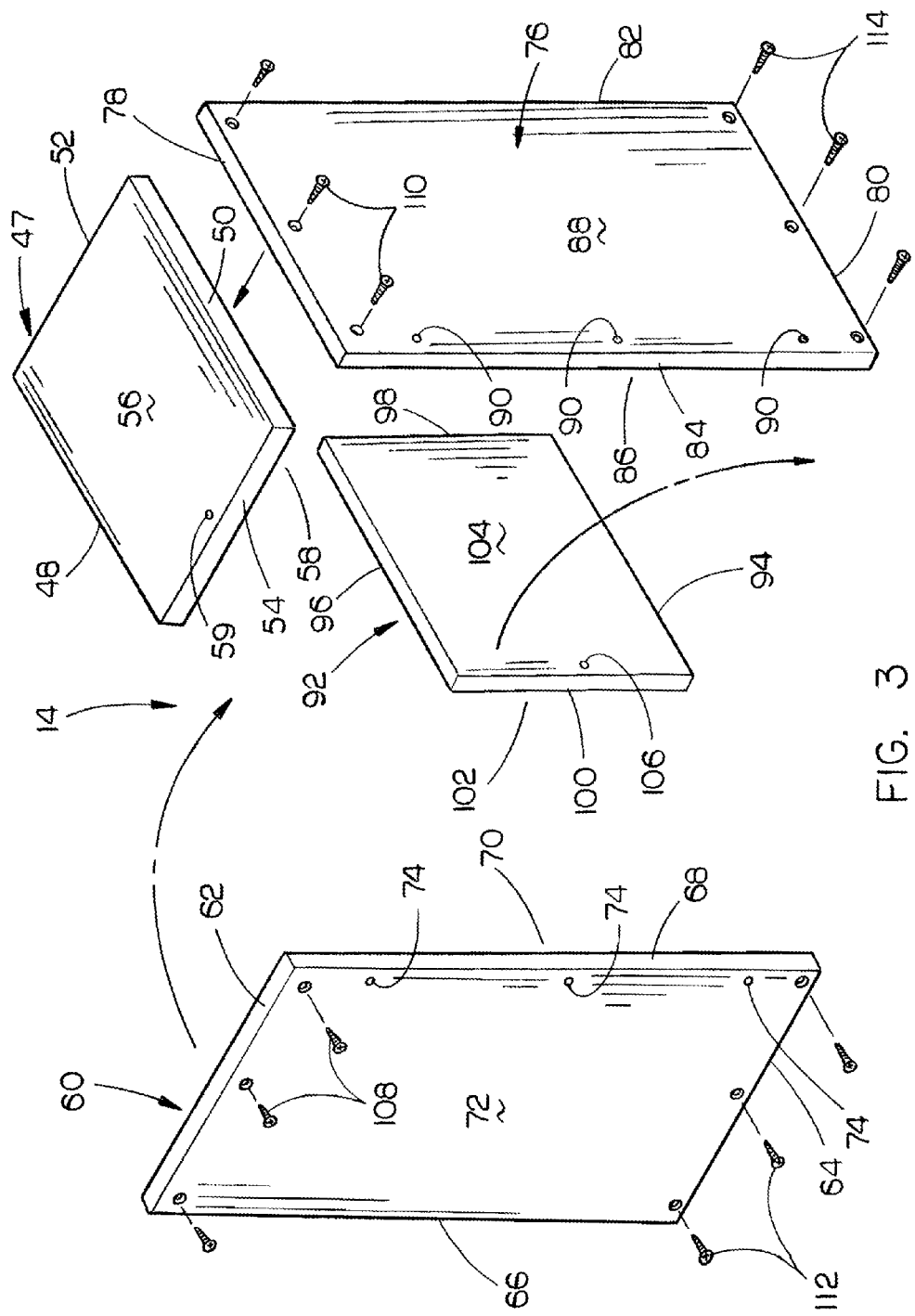
FIG. 3 is an exploded perspective view of the cabinet box to which a face frame is to be secured.

The second lever arm 30 has a pair of spaced-apart ears 38 and 40 extending therefrom between the handle portion 32 and the clamping portion 34. A pivot pin 41 pivotally connects the ears 26 and 28 to the ears 38 and 40 whereby the lever arms 16 and 30 may be moved between conventional clamping and non-clamping positions, as seen in FIG. 2. A spring 42 is mounted on the pivot pin 41 and engages the inner sides of lever arms 16 and 30 to yieldably urge the lever arms 16 and 30 to their clamping positions, as seen in FIG. 2.

The numeral 43 refers to an elongated pin, shaft or rod having an inner end 46 and an outer end 45. The inner end 44 of pin 43 is secured to the clamping jaw 36 so that pin 43 extends outwardly therefrom in a generally parallel relationship to clamping portion 34. The pin 43 has a length whereby the outer end 45 of pin 43 will engage the inside of pad or sleeve 22 at the outer end of the clamping portion of the first lever arm when the clamping portions 20 and 34 are in the clamping position of FIG. 1. Preferably the pin 43 has serrations 46 on its outer surface.

The traditional cabinet box or carcass 14 will have varying heights, widths and depths. The cabinet box 14 will be described as being in its vertically disposed position as when secured to a wall or the like. Cabinet box 14 will usually be constructed of wood, laminated wood or other material. Cabinet box 14 includes a horizontally disposed upper wall member 47 having a first end 48, a second end 50, an inner end 52, an outer end 54, an outer surface 56 and an inner surface 58. An opening or hole 59 is drilled in the outer surface 56 of upper wall member 47 which extends partially thereinto. It is preferred that the hole 59 has a diameter of approximately 5 mm. It is preferred that the hole 59 is spaced approximately 1.25 inches from the outer end 54.

Cabinet box 14 also includes a vertically disposed first side wall member 60 having an upper end 62, a lower end 64, an inner end 66, an outer end 68, an inner surface 70 and an outer surface 72. Side wall member 60 has a plurality of spaced-apart openings or holes 74 drilled therein which partially extend inwardly from the outer surface 72 inwardly of outer end 68. It is preferred that the holes 74 have at least a diameter of 5 mm. It is preferred that the holes 74 be spaced approximately 1.25 inches from outer end 68.

Cabinet box 14 also includes a vertically disposed second side wall member 76 having an upper end 78, a lower end 80, an inner end 82, an outer end 84, an inner surface 86 and an outer surface 88. Side wall member 76 has a plurality of spaced-apart openings or holes 90 drilled therein which partially extend inwardly from the outer surface 88 inwardly of outer end 84. It is preferred that the holes 90 have at least a diameter of 5 mm. It is preferred that the holes 74 be spaced approximately 1.25 inches from outer end 84.

Cabinet box 14 also includes a horizontally disposed lower wall member 92 having a first end 94, a second end 96, an inner end 98, an outer end 100, an inner surface 102 and an outer surface 104. At least one opening or hole 106 is drilled into the outer surface 104 of lower wall member 92 which extends partially thereinto. It is preferred that the hole 106 has at least a diameter of 5 mm. It is preferred that the hole 106 is spaced approximately 1.25 inches from outer end 100.

The upper end of side wall member 60 is secured to the first end 48 of upper wall member 47 by screws 108 nails, staples or the like in a transverse manner. The upper end 78 of side wall member 76 is secured to the second end 50 of upper wall member 47 by screws 110, nails, staples or the like.

The lower end 64 of side wall member 60 is secured to the first end 94 of lower wall member 92 by screws 112, nails, staples, or the like. The lower end 80 of side wall member 76 is secured to the second end 96 of lower wall member 92 by screws 114, nails, staples, or the like.

The face frame 12 includes a top rail 116, a bottom rail 118, a first side stile 120 and a second side stile 122. Face frame 12 may include a mid-rail 124 which extends between stiles 120 and 122.

Figure 4:
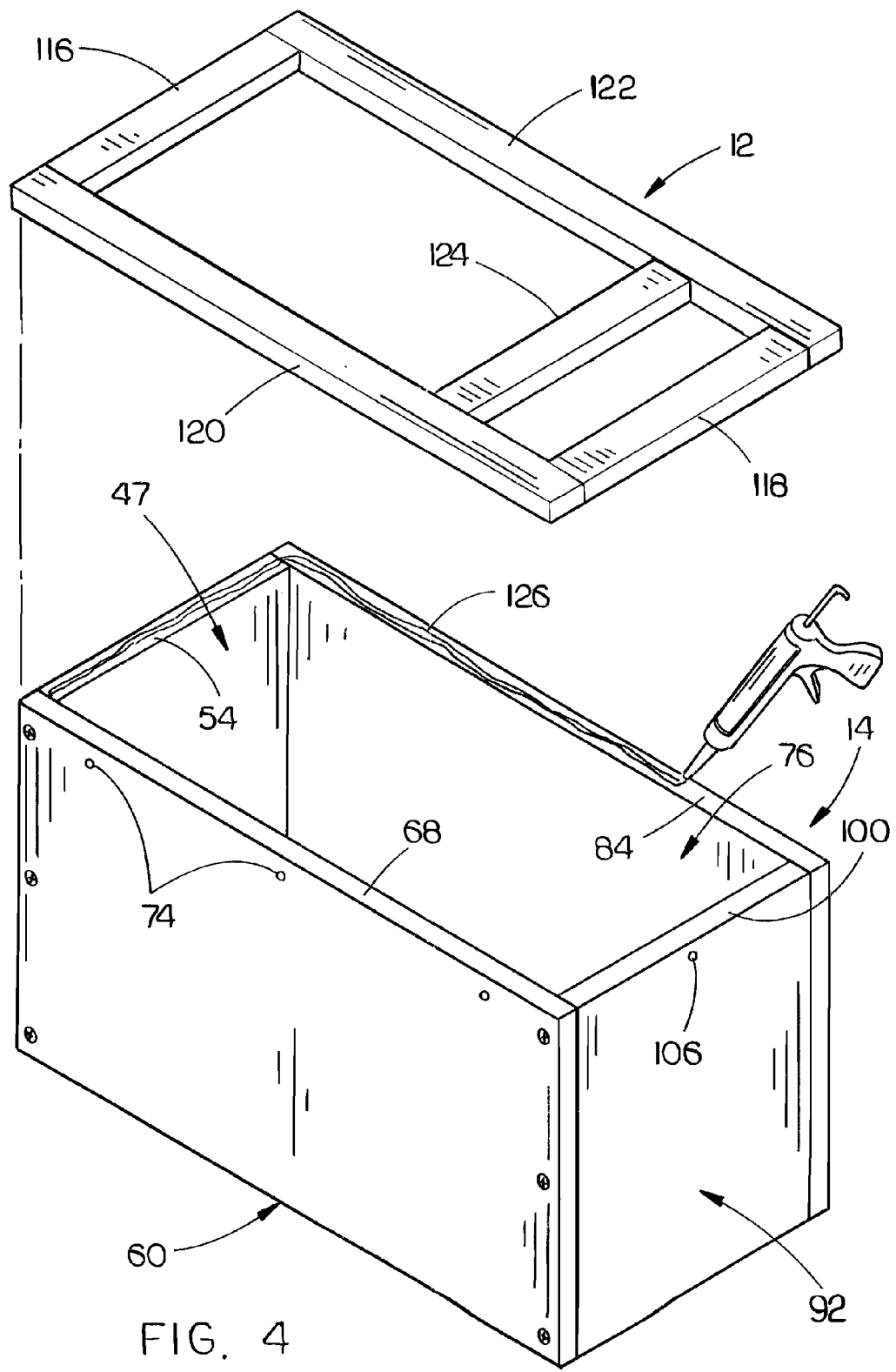
FIG. 4 is an exploded perspective view of the cabinet box and face frame and which illustrates glue being applied to the outer ends of the wall members of the cabinet box.
Figure 5:
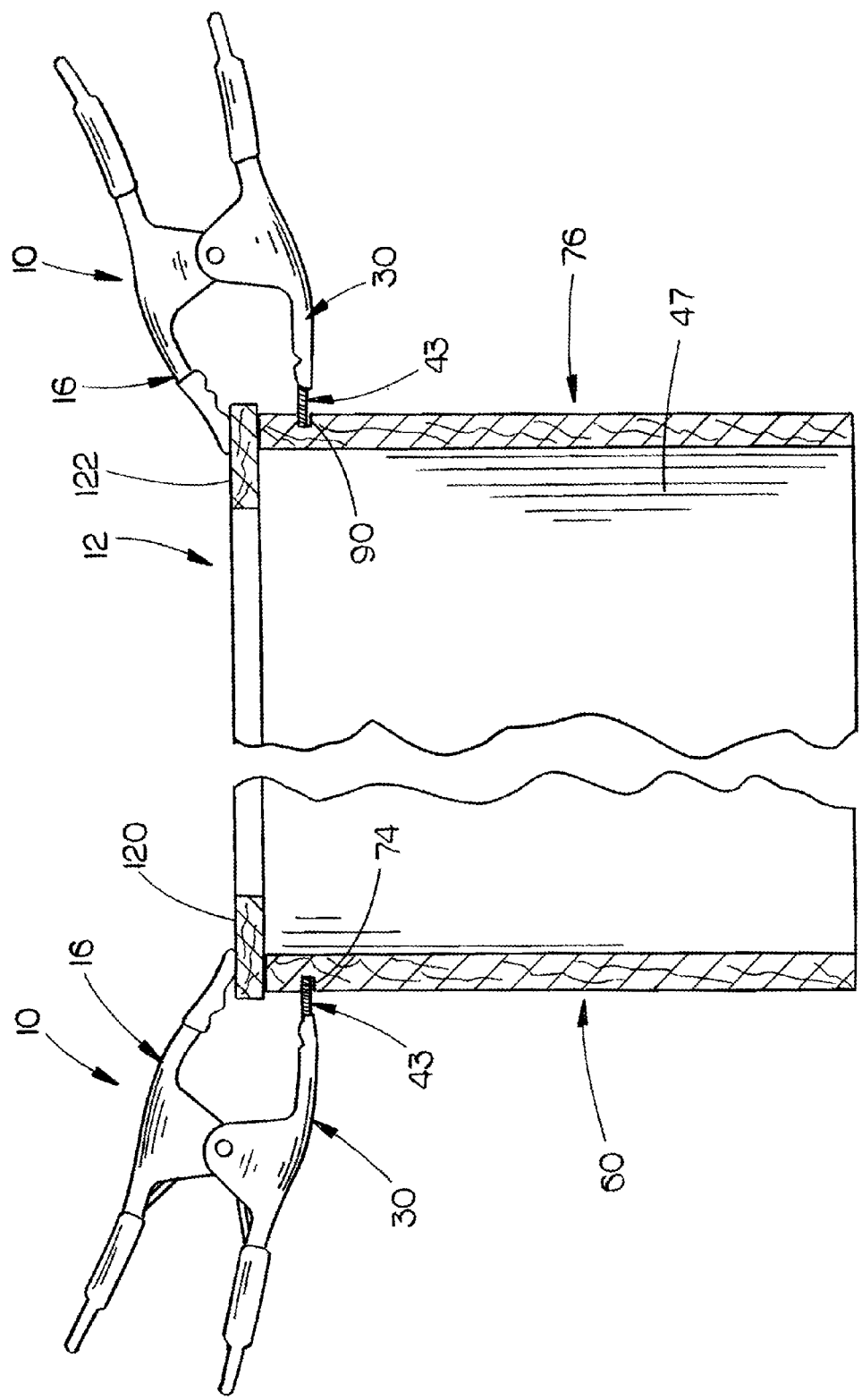
FIG. 5 is an end sectional view illustrating the manner in which the face frame is clamped onto the outer ends of the side wall members of the cabinet box.
Figure 6:
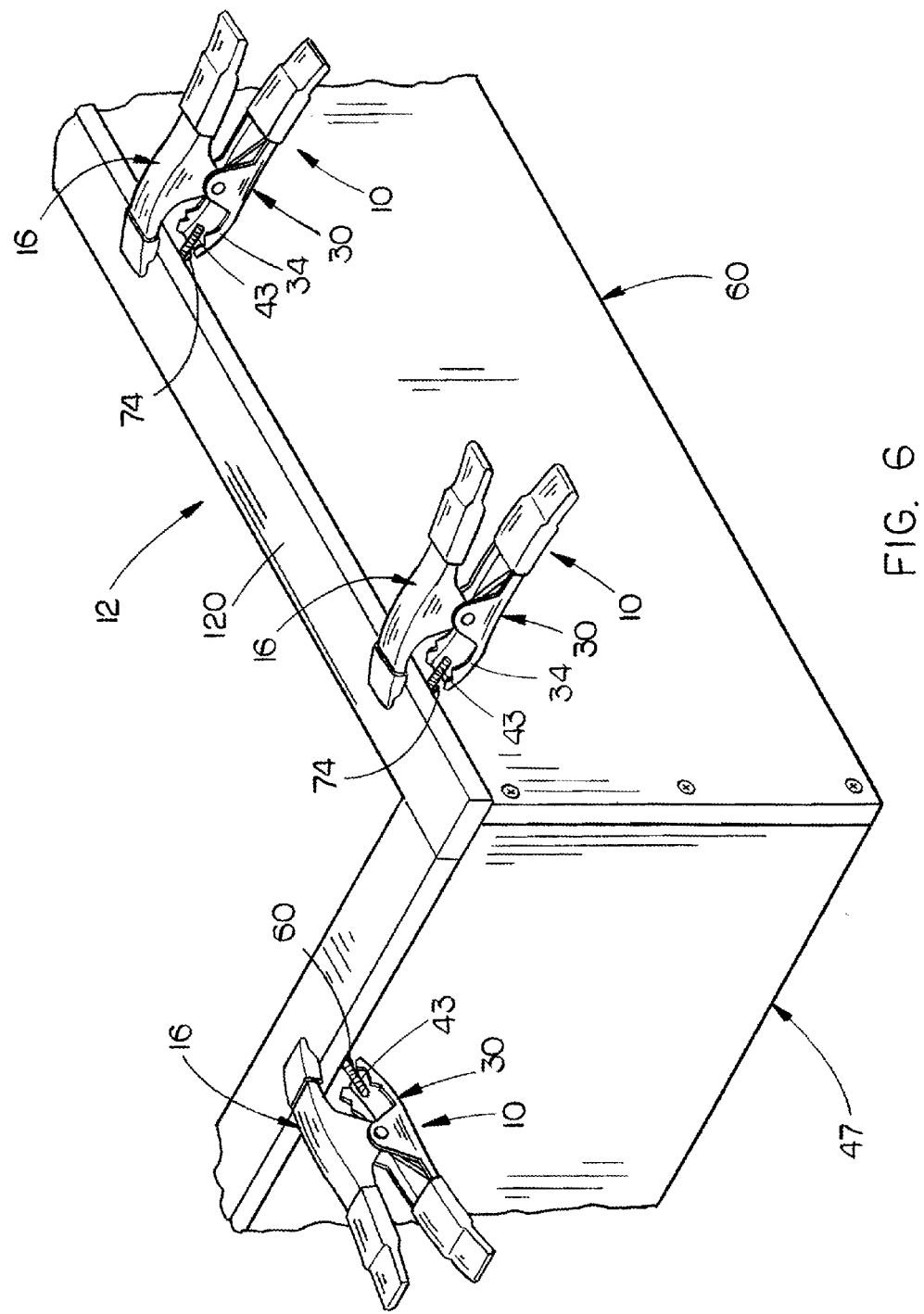
FIG. 6 is a partial perspective view illustrating the face frame being clamped onto the outer ends of the first side wall member and the upper wall member.
Figure 7:
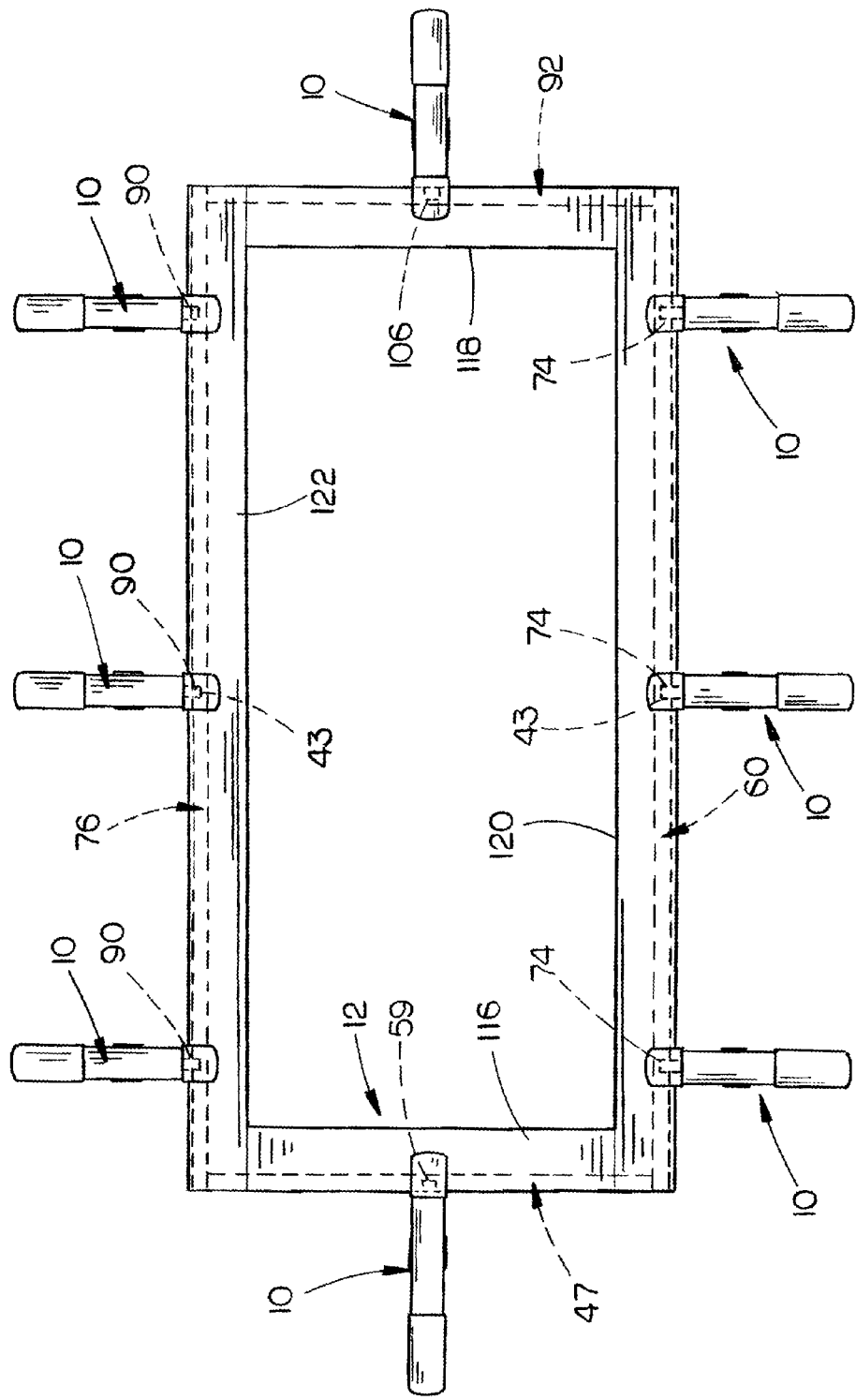
FIG. 7 is a top elevational view illustrating the top rail, the bottom rail, the first stile and the second stile of the face frame being clamped onto the outer ends of the wall members of the cabinet box.

After the cabinet box 14 has been assembled, the cabinet box 14 will usually be placed on a horizontally disposed work support so that the wall members 47, 60, 76 and 92 are vertically disposed with the inner ends thereof resting on the work support. Glue 126 is then placed on the outer ends 54, 68, 84 and 100 of wall members 47, 60, 76 and 92 respectively. The face frame 12 is then positioned on the glued outer ends of the wall members 47, 60, 76 and 92 as depicted in FIGS. 4 and 7 and partially depicted in FIGS. 5 and 6. The spring clamps 10 are then clamped into position as illustrated in FIGS. 5-7. Inasmuch as each of the spring clamps 10 are clamped onto the face frame 12 and the wall members of cabinet box 14, only one such clamping step will be described. The handle portions 18 and 32 of lever arms 16 and 30 are squeezed together against the force of the spring 42. The outer end 45 of the pin 43 on clamping jaw 36 is inserted into one of the openings or holes 59, 74, 90 or 106 with the clamping jaw 22 of lever arm 16 being positioned above one of the rails or stiles of face frame 12. The worker then permits the lever arms 16 and 30 to move to their clamping position. Spring 42 clamps the rail or stile of face frame 12 onto the cabinet box 14. The serrations 46 on pin 43 serve to increase the connection between the pin 43 and the respective wall member. The above-described steps are repeated for each of the spring clamps 10. In some cases, it may not be necessary to utilize spring clamps on the top and bottom rails of the face frame although it is preferred to do so. When the glue has set, the clamps 10 are removed.

Figure 8:
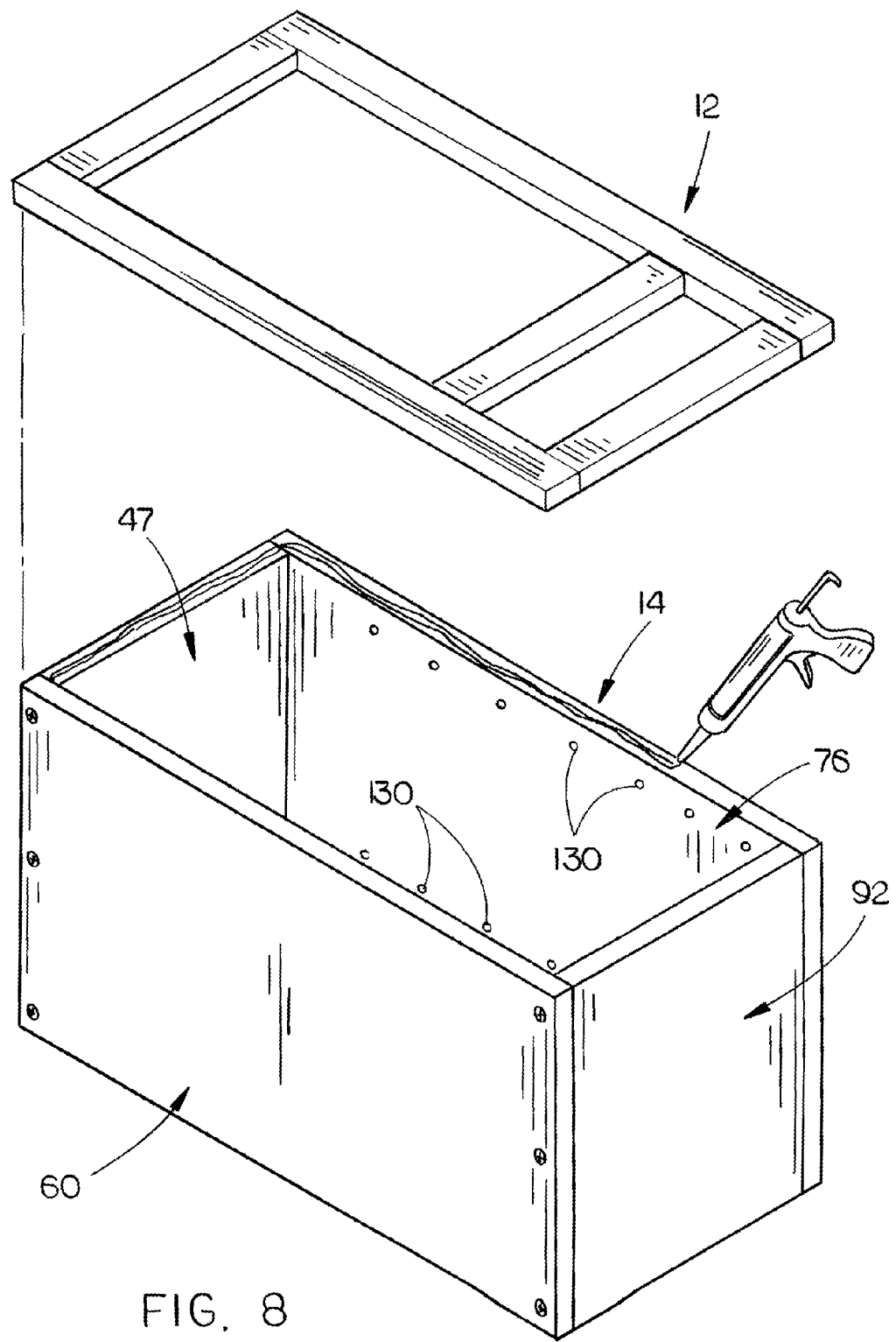
FIG. 8 is an exploded perspective view of a face frame and a second style of a cabinet box which illustrates glue being applied to the outer ends of the cabinet box.
Figure 9:
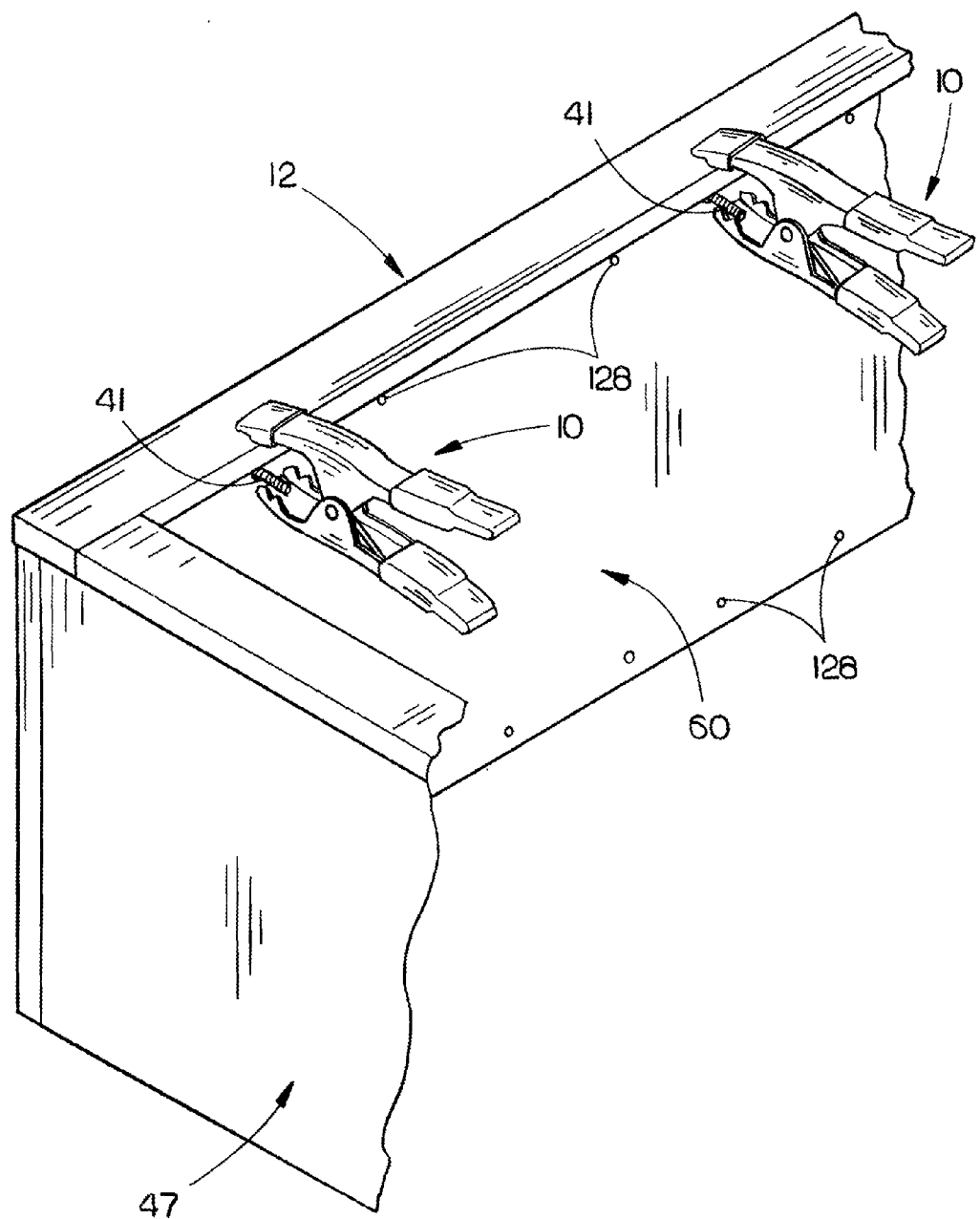
FIG. 9 is a partial perspective view illustrating a pair of the spring clamps of FIG. 1 being used to clamp the face frame onto the cabinet box of FIG. 8.

In those cabinet boxes having shelf adjustment holes on the inner surfaces of the side wall members, it may not be necessary to drill the holes 59, 74, 90 and 106. Such a case is illustrated in FIGS. 8 and 9 wherein the cabinet box 14 has shelf adjustment holes 128 formed in the inner surface of side wall member 60 and shelf adjustment holes 130 formed in the inner surface of side wall member 76. The pins 41 of the spring clamps 10 are inserted into the shelf adjustment holes 128 or 130 to clamp the face frame 12 onto the cabinet box 14. In this case, it may be necessary to drill holes in the inside surfaces of wall members 47 and 92. The design of the spring clamp 10 allows the pressure of the clamp to be at the centerline of the glue line so as to not pull the face frame 12 out of alignment when the glue is in the wet stage. Further, the padded surface 25 of the lever arm 16 allows the face frame to be pre-finished prior to it being attached to the cabinet box.

If any of the clamp holes or openings must be hidden, plastic caps may be inserted thereinto. A thin finish panel or veneer may also be applied to the cabinet box at the finish ends thereof to hide the holes or openings.

It can therefore be seen that a unique spring clamp has been provided to secure a face frame to a cabinet box without nails, pocket screws, staples, etc.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A method of assembling a face frame cabinet, comprising the steps of:
   providing an upper wall member having an outer end, an inner end, a first end, a second end, an outer surface, and an inner surface,
   providing a lower wall member having an outer end, an inner end, a first end, a second end, an outer surface, and an inner surface,
   providing a first side wall member having an outer end, an inner end, an upper end, a lower end, an outer surface, and an inner surface;
   providing a second side wall member having an outer end, an inner end, an upper end, a lower end, an outer surface, and an inner surface,
   securing said upper end of said first side wall member to said first end of said upper wall member in a transverse manner;
   securing said upper end of said second side wall member to said second end of said upper wall member in a transverse manner;
   securing said first end of said lower wall member to said lower end of said first side wall member in a transverse manner;
   securing said second end of said lower wall member to said lower end of said second side wall member;
   drilling a plurality of spaced-apart openings in said outer surface of said first side wall member which extend partially into said first side wall member and which are spaced inwardly from said outer end thereof;
   drilling a plurality of spaced-apart openings in said outer surface of said second side wall member which extend partially into said second side wall member and which are spaced inwardly from said outer end thereof;
   placing the assembled upper wall members on a generally horizontally disposed work surface so that said inner ends of said wall members rest upon the work surface;
   applying glue to said outer ends of said upper wall member, said lower wall member, said first side wall member and said second side wall member;
   providing a face frame having an upper rail, a lower rail, a first stile and a second stile;
   placing said face frame onto the glued outer ends of said upper wall member, said lower wall member, said first side wall member, and said second side wall member;
   providing a plurality of spring clamps with each of the spring clamps having opposing first and second clamping portions with the second clamping portion having an elongated pin extending therefrom in a generally parallel manner with respect to the second clamping portion towards the first clamping portion;
   positioning one of the spring clamps adjacent the outer surface of the first side wall member adjacent the outer end thereof whereby the pin of the second clamping portion thereof is received in one of the openings formed in the outer surface of the first side wall member and whereby the first clamping portion of the spring clamp is in clamping engagement with the portion of the face frame which is positioned on the outer end of the first side wall member;
   positioning another of the spring clamps adjacent the outer surface of the second side wall member adjacent the outer end thereof whereby the pin of the second clamping portion thereof is received in one of the openings formed in the outer surface of the second side wall member and whereby the first clamping portion of the spring clamp is in clamping engagement with the portion of the face frame which is positioned on the outer end of the second side wall member; and
   removing the spring clamps from the face frame and cabinet box after the glue has set.

2. The method of claim 1 wherein a plurality of spring clamps clamp the face frame to the outer end of the first side wall member and wherein a plurality of spring clamps clamp the face frame to the outer end of the second side wall member.

3. The method of claim 1 wherein at least one opening is drilled into the outer surface of the upper wall member and whereby at least one opening is drilled into the outer surface of the lower wall member and whereby a spring clamp, identical to the other spring clamps, has its pin received in the opening in the outer surface of the upper wall member to clamp the upper rail of the face frame to the outer end of the upper wall member and whereby a spring clamp, identical to the other spring clamps, has its pin received in the opening in the outer surface of the lower wall member to clamp the lower rail of the face frame to the outer end of the lower wall member.

4. A method of assembling a face frame cabinet, comprising the steps of;
   providing an upper wall member having an outer end, an inner end, a first end, a second end, an outer surface, and an inner surface,
   providing a lower wall member having an outer end, an inner end, a first end, a second end, an outer surface, and an inner surface,
   providing a first side wall member having an outer end, an inner end, an upper end, a lower end, an outer surface, and an inner surface with the inner surface of the first side wall member having an outer row of vertically spaced-apart shelf adjustment openings formed therein and an inner row of vertically spaced-apart shelf adjustment openings formed therein;
   providing a second side wall member having an outer end, an inner end, an upper end, a lower end, an outer surface, and an inner surface with the inner surface of the second side wall member having an outer row of vertically spaced-apart shelf adjustment openings formed therein and an inner row of vertically spaced-apart shelf adjustment openings formed therein;
   securing said upper end of said first side wall member to said first end of said upper wall member in a transverse manner;
   securing said upper end of said second side wall member to said second end of said upper wall member in a transverse manner;
   securing said first end of said lower wall member to said lower end of said first side wall member in a transverse manner;
   securing said second end of said lower wall member to said lower end of said second side wall member;
   placing the assembled upper wall members on a generally horizontally disposed work surface so that said inner ends of said wall members rest upon the work surface;
   applying glue to said outer ends of said upper wall member, said lower wall member, said first side wall member and said second side wall member;
   providing a face frame having an upper rail, a lower rail, a first stile and a second stile;

placing said face frame onto the glued outer ends of said upper wall member, said lower wall member, said first side wall member, and said second side wall member;

providing a plurality of spring clamps with each of the spring clamps having opposing first and second clamping portions with the second clamping portion having an elongated pin extending therefrom towards the first clamping portion thereof;

positioning one of the spring clamps adjacent the inner surface of the first side wall member adjacent the outer end thereof whereby the pin of the second clamping portion thereof is received in one of the openings in the outer row of shelf adjustment openings of the first side wall member and whereby the first clamping portion of the spring clamp is in clamping engagement with the portion of the face frame which is positioned on the outer end of the first side wall member;

positioning another spring clamp adjacent the inner surface of the second side wall member adjacent the outer end thereof whereby the pin of the second clamping portion thereof is received in one of the openings in the outer row of shelf adjustment openings of the second side wall member and whereby the first clamping portion of the spring clamp is in clamping engagement with the portion of the face frame which is positioned on the outer end of the second side wall member; and removing the spring clamps from the face frame and cabinet box after the glue has set.

5. The method of claim 4 wherein a plurality of spring clamps clamp the face frame to the outer end of the first side wall member and wherein a plurality of spring clamps clamp the face frame to the outer end of the second side wall member.

6. The method of claim 4 wherein at least one opening is drilled into the outer surface of the upper wall member and whereby at least one opening is drilled into the outer surface of the lower wall member and whereby a spring clamp, identical to the other spring clamps, has its pin received in the opening in the outer surface of the upper wall member to clamp the upper rail of the face frame to the outer end of the upper wall member and whereby a spring clamp, identical to the other spring clamps, has its pin received in the opening in the outer surface of the lower wall member to clamp the lower rail of the face frame to the outer end of the lower wall member.

7. The method of claim 4 wherein at least one opening is drilled into the inner surface of the upper wall member and whereby at least one opening is drilled into the inner surface of the lower wall member and whereby a spring clamp, identical to the other spring clamps, has its pin received in the opening in the inner surface of the upper wall member to clamp the upper rail of the face frame to the outer end of the upper wall member and whereby a spring clamp, identical to the other spring clamps, has its pin received in the opening in the inner surface of the lower wall member to clamp the lower rail of the face frame to the outer end of the lower wall member.

* * * * *